United States Patent [19]
Muller et al.

[11] Patent Number: 5,017,911
[45] Date of Patent: May 21, 1991

[54] METHOD AND APPARATUS FOR MEASURING THE TENSION OF AN ADVANCING YARN

[75] Inventors: Manfred Muller, Wuppertal; Bernd Neumann, Radevormwald; Manfred Stuttem, Kurten, all of Fed. Rep. of Germany

[73] Assignee: Barmag AG, Remscheid, Fed. Rep. of Germany

[21] Appl. No.: 532,340

[22] Filed: Jun. 4, 1990

[30] Foreign Application Priority Data

Jul. 6, 1989 [DE] Fed. Rep. of Germany ....... 3922245

[51] Int. Cl.⁵ .............................................. G08B 21/00
[52] U.S. Cl. ......................................... 340/677; 19/26; 57/81; 66/163; 364/552
[58] Field of Search .............. 340/677; 19/26; 66/163, 66/161; 28/187; 242/45; 57/81; 364/552, 551.01

[56] References Cited

U.S. PATENT DOCUMENTS

| | | | |
|---|---|---|---|
| 3,931,938 | 1/1976 | Hasegawa et al. | 242/45 |
| 4,685,629 | 8/1987 | Sugioka | 242/45 |
| 4,720,702 | 1/1988 | Martens | 66/163 |
| 4,720,806 | 1/1988 | Schippers et al. | 364/551.01 |

*Primary Examiner*—Glen R. Swann, III
*Attorney, Agent, or Firm*—Bell, Seltzer, Park & Gibson

[57] ABSTRACT

A method and apparatus measures the tension of an advancing yarn which is subject to interruptions of the yarn path, resulting for example from the severance of the yarn. During such interruptions, the zero setting of the tension sensor does not always return to zero, thereby providing an erroneous output reading during subsequent yarn advancing cycles. In accordance with the present invention, a circuit is provided which identifies such errors and sounds an alarm when the error exceeds a predetermined limit. Also, the erroneous output signal is input as the zero point signal for the subsequent yarn advancing cycle, and during such subsequent cycle, the tension is determined on the basis of the newly set zero point.

10 Claims, 2 Drawing Sheets

METHOD AND APPARATUS FOR MEASURING THE TENSION OF AN ADVANCING YARN

BACKGROUND OF THE INVENTION

The present invention relates to a method and apparatus for measuring the tension of an advancing yarn which is subject to periodic interruptions in its advance, and which is characterized by the ability to correct for any errors in the zero point output signal of the tension sensor.

German patent 24 12 153 and the corresponding U.S. Pat. No. 3,931,938, disclose a yarn winding process wherein the yarn tension is periodically detected by a sensor located at the edge of the area covered by the traverse motion of the yarn. The output of the sensor is compared with a preset desired value, and the difference is fed into a controller which acts upon a regulator for varying the speed of rotation of the winding spindle, thereby keeping the yarn tension at the desired value throughout the winding operation.

The above described winding process results in the periodic release of the sensor, and upon such release, the sensor should deliver a zero signal. However, because of heat, wear, or other possible factors, the sensor does not always return to a zero signal, and the signal may in fact drift from zero. Thus the above described method and apparatus is not suitable for continuously obtaining the absolute value of the yarn tension when the tension is periodically interrupted.

It is accordingly an object of the present invention to provide a method and apparatus for measuring the tension of an advancing yarn in a process which is subject to interruptions in the yarn path, resulting for example from the severance of the yarn, and wherein the measured signal is not falsified by errors in the zero point reading, and wherein it is possible to recognize errors of the measuring system which lead to the falsification of the measuring signals.

SUMMARY OF THE PRESENT INVENTION

The above and other objects and advantages of the present invention are achieved in the embodiment illustrated herein by the provision of a method and apparatus which includes the steps of continuously monitoring the tension of the advancing yarn with a sensor and, so that the sensor produces an output signal representative of the tension, monitoring the output signal of the sensor whenever the yarn is interrupted to thereby produce a zero point output signal UOn upon each interruption, and storing each zero point output signal in a computer memory. Each zero point output signal UOn is compared with a previously generated zero output signal UOn-1 to determine a zero point drift D, and an alarm signal is generated when the drift D exceeds a predetermined limit value GD.

In the preferred embodiment, the determined zero point drift D is stored in the computer memory, and the values of the drift D occurring after each of the interruptions are summed to define a drift sum SD. The drift sum is then compared to a predetermined drift sum limiting value GSD, and an alarm signal is generated when the drift sum exceeds the drift sum limiting value. Also, after each interruption of the advance of the yarn, the indicated output signal is preferably input as the zero point signal for the subsequent yarn advancing cycle.

In accordance with the present invention, a periodic monitoring of the zero point is not performed during a continuous operation, but rather, the monitoring of the zero point during the operation is conducted in such a manner which allows recognition of errors in the system.

BRIEF DESCRIPTION OF THE DRAWINGS

Some of the objects and advantages of the present invention having been stated, others will become apparent as the description proceeds, when taken in conjunction with the accompanying drawings, in which.

DETAILED DESCRIPTION OF THE PREFERRED EMBODIMENTS

Figure 1:
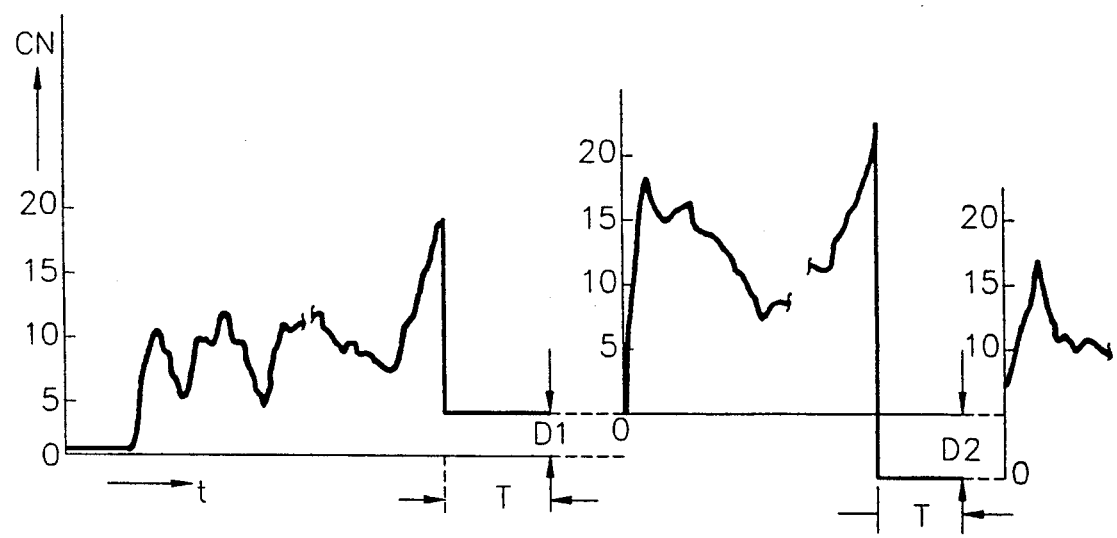
FIG. 1 is a diagram illustrating a segment of a graph of yarn tension versus time, with the yarn tension being indicated in cN (centi-Newtons)

Referring more particularly to FIG. 1, there is illustrated a typical recording of the tension of an advancing yarn which is being wound on a package. During such winding operation, it is conventional to interrupt the winding process and the yarn path when the package is fully wound. In this event, the yarn is intentionally cut. Furthermore, it is possible to end the winding cycle and interrupt the yarn path when failures occur during the winding process, which lead to such high tensions that the yarn ruptures. It may also be provided that a yarn cutter is actuated, when the yarn tension drops for a certain short period of time below a predetermined lower limiting value. In this event the yarn tension sensor and a subsequent computer, which evaluates the tension signals, emit a signal to the yarn cutter, which precedes the yarn sensor.

In these three cases, the operation of the yarn treatment or yarn production station and thus the yarn path are interrupted. This means that the output signal of the yarn sensor would have to return to its original value, i.e., zero, without any disturbing influences. However, it is not always possible to exclude disturbing influences, and as shown in FIG. 1, the output signal of the sensor has not returned to zero after a first winding cycle, despite the absence of a yarn. The difference between the original zero point signal and the present output signal is indicated as the drift D1 of the zero point. According to the present invention, the presently obtained output signal is input as the zero point signal for the following winding cycle, and is stored by the computer. As is shown by the continued recording of the measuring for the second winding cycle, the yarn tension is recorded on the basis of the newly set zero point.

When the yarn path is now again interrupted, another drift D2 can occur, and the zero point is again reset. According to the invention, the zero point drifts D1, D2 ... Dn which occur during the course of the time are summed, and when the sum of the drifts SD exceed a certain, predetermined limiting value GSD, the computer emits a warning signal, which indicates a defect of the yarn station or respectively the sensor. A new adjustment of the yarn sensor will then become necessary.

Each individual drift D1, D2 ... Dn is also monitored so that a certain, predetermined limiting value of the drift GD is not exceeded. Also in this case, the computer emits a warning signal, which indicates a defect of the yarn station or respectively the sensor. As a typical example, the limiting value of the drift can amount to 5 cN, and the limiting value of drift sum GSD to 20 cN.

The readjustment of the zero point to the respective drift value preferably occurs only after a certain time T following the interruption of the yarn path. Also, the output signal is stored as a new zero point which is present on the yarn sensor only after a certain time T following the interruption of the yarn path. This period of time T may, for example, be 30 seconds. It is thus ensured that the yarn tension sensor reaches first its steady state condition, and that short-time interferences, which may, for example, be produced by servicing, do not enter into the zero point adjustment.

Figure 2:
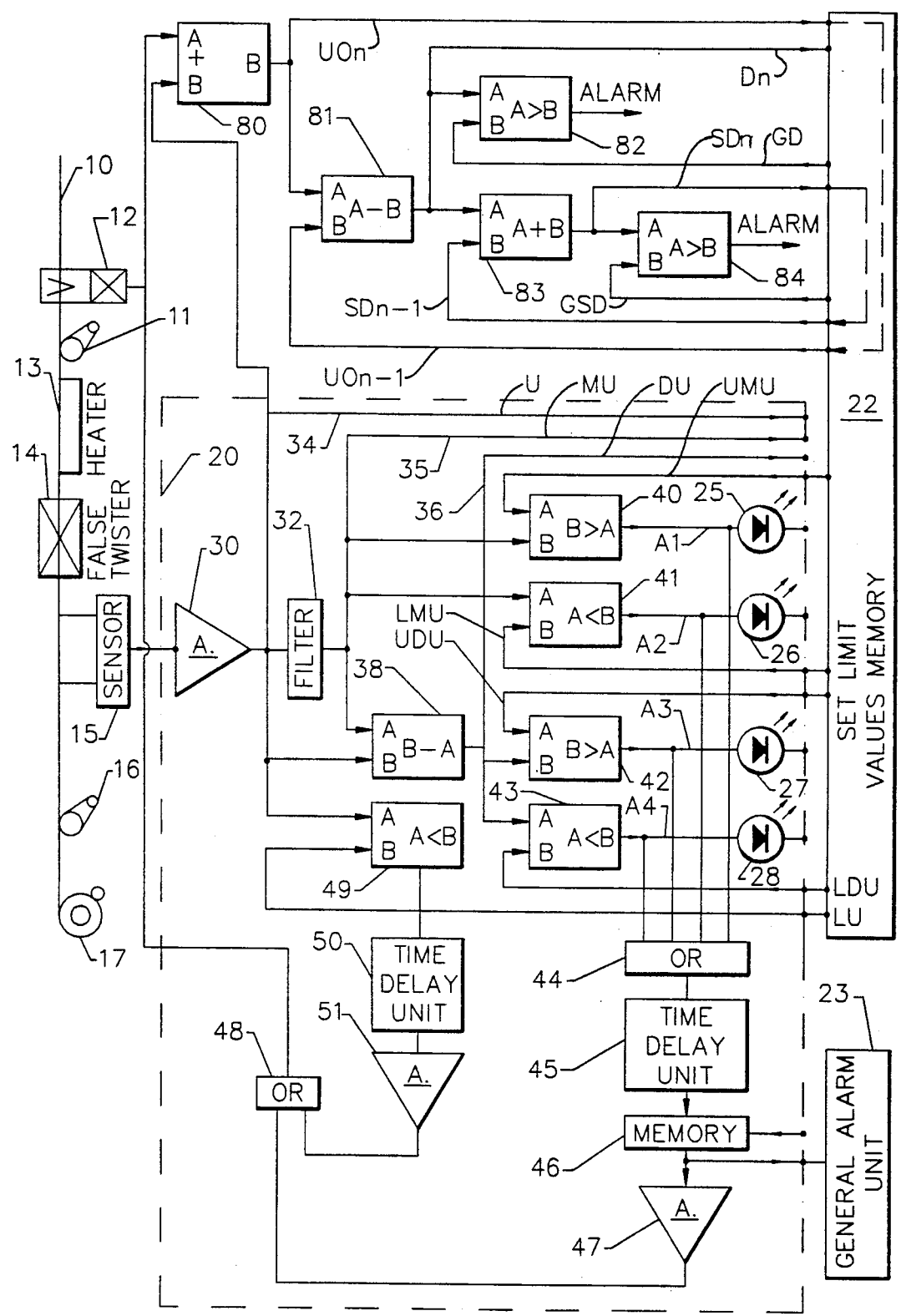
FIG. 2 is a schematic diagram illustrating an apparatus and electrical control circuit in accordance with the present invention.

FIG. 2 is a schematic diagram illustrating a yarn processing station and associated control circuitry in accordance with the present invention. The left hand portion of the diagram illustrates one yarn processing station of a multi-position false twist machine, and wherein a yarn 10 is withdrawn from a supply roll or other source (not shown) by delivery roll 11. The yarn advances past a conventional yarn cutter 12, and then it is guided across and in contact with a heater 13, through a false twister 14, and past a yarn sensor 15. The yarn is withdrawn from the false twisting zone by delivery roll 16 and wound onto a package 17 by means of a conventional winder.

The output signal U of the sensor 15 is transmitted to a circuit 20, which is illustrated within the dash-dot line of FIG. 2. Circuit 20 is associated with each position of the multi-position false twist machine, and with the yarn sensor 15 of such position. The circuit 20 receives predetermined tolerance values from a set limit values memory 22 which is described below in more detail. Memory 22 is associated with a group of stations of the multi-position texturing machine. Circuit 20 produces one output signal to the yarn cutter 12 and another output signal to a general alarm unit 23 which is also associated with a group of stations. Circuit 20, furthermore, produces output signals to alarm units 25, 26, 27, 28 which will be described below in more detail. These alarm units are correlated to the associated processing station.

The output signal of yarn sensor 15 is fed to amplifier 30 and then to filter 32. The filter is a circuit containing an induction coil and a capacitor, the circuit having a delay time constant of for example one to three seconds. The output signal of the amplifier 30 is a voltage U which may be fed to a central microprocessor for further processing and calculation via line 34. The output of filter 32 is the mean value MU which may also be fed to a general microprocessor via line 35 for further processing and calculation. On the other side, signal U and signal MU are fed to differential amplifier 38 producing an output signal DU which represents the difference of the input signals U and MU. The output signal DU of the differential amplifier 38 may be fed via line 36 to the central microprocessor for further processing and calculation.

The output signal MU of the filter 32 is furthermore used to produce alarm signals A1 and A2, if the mean value MU leaves the predetermined range of tolerance. The predetermined range of tolerance is defined by the upper limit of the mean value UMU and by the lower limit of the mean value LMU, both of which are stored in the limit values memory 22 and fed to circuit 20 via respective lines. The circuit 20 for this purpose contains triggers 40 and 41. Trigger 40 is fed by the mean value MU and the upper limit of the mean value UMU, and it is designed to produce an output signal A1, if the mean value exceeds the set upper limit of the mean value. Trigger 41 is designed to receive the mean value MU and set lower limit of the mean value LMU as an input signal and to produce an output signal A2, if the mean value Mu is lower than the set lower limit of the mean value.

The circuit 20 also produces alarm signals A3, A4, if the differential signal DU exceeds the predetermined range which is defined by a set upper limit of the differential value UDU and the set lower value of the differential value LDU. The predetermined upper and lower limits are stored in the limit values memory 22 and fed as input signals to triggers 42 and 43, respectively, of the circuit 20. The other input signal to the triggers 42 and 43 is the differential signal DU which is the output of differential amplifier 38 as described above. If the differential signal DU is greater than the set upper limit UDU, trigger 42 produces alarm signal A3. If differential value DU is smaller than the set lower limit LDU, trigger 43 produces alarm signal A4. Each of the alarm signals A1, A2, A3, A4 is fed to either one of the alarm units 25-28 which are associated with this position and which are, e.g., designed as a light emitting diode integrated into the circuit 20. Furthermore, alarm signals A1 to A4 are fed to OR gate 44, delay time unit 45, memory 46 and amplifier 47. The OR gate 44 produces an output signal, if any one of the alarm signals A1 to A4 is present. The delay time unit has a delay constant of about 10 msec, and is designed to prevent an output signal from a transient and irrelevant disturbance of the yarn texturing process, and which could result in the yarn 10 being cut by yarn cutter 12. The memory 46 ensures that a general alarm unit 23, which is associated with a group of stations or with the entire machine, will be able to generate a permanent signal to show that the production is disturbed and/or terminated.

The output signal of the memory 46 is also fed to an amplifier 47 and from there to OR gate 48, which receives another signal to be more fully described below. The output signal of the amplifier 47 produces an output signal of the OR gate 48, which in turn is fed to the yarn cutter 12 to cause cutting of the yarn and interruption of the texturizing or draw-texturizing process, as the case may be. The other input signal to OR gate 48 is produced by trigger 49 via delay time unit 50 and amplifier 51. Trigger 49 is fed by the value U representing the measured yarn tension and by a second set value LU stored in set limit values memory 22 and representing the lowest accepted value of the yarn tension. It should be noted that this value LU is preferably set at zero. Trigger 49 produces an output signal, if the measured value U is lower than or equal to the set value LU. The delay time constant of unit 50 may be about 10 msec. The output signal of trigger 49 is, as mentioned above, fed to OR gate 48 and causes yarn cutter 12 to cut the yarn upstream of delivery roll 11, if and when the yarn tension is below a set value or in case of a yarn break between delivery rolls 11 and 16.

The above described circuit generally conforms to that disclosed in the U.S. Pat. No. 4,720,702, to Martens. In accordance with the present invention, the signal activating the cutter 12 from the OR gate 48, and the signal U from the amplifier 30 are fed to an summing circuit 80 arranged to deliver an output signal, if both the activating signal for the cutter 12 as well the output signal U from the amplifier 30 are present. The output signal of gate 80 accordingly is equal to the output signal of the amplifier 30, if no yarn is present. This output signal of summing circuit 80 is called the zero-signal UOn. The zero-signal is delivered to the set limit values memory 22 and, furthermore, to a difference circuit 81. Difference circuit 81 has another input connected to the memory 22. Fed via this input is another so-called old zero-signal stored in the set limit values memory 22 during occurrence of the previous yarn cut. This other zero-signal is, therefore, called UOn-1. Difference circuit 81 forms the difference Dn between the new zero-signal UOn and the old zero-signal UOn-1 as an output signal. This difference Dn is stored in the memory 22. In addition, the difference Dn is fed to a trigger 82, with the other input being a predetermined limit value GD which has been previously stored in the computer memory 22. If the difference Dn exceeds the limit value GD, an alarm is actuated. The difference Dn is also fed to a further summing circuit 83. The other input of summing circuit 83 is the so-called old sum of the difference SDn-1 which has been stored in the memory 22 during occurrence of the previous yarn cuts. The output of summing circuit 83 accordingly is the sum SD of all the differences D1 to Dn which have occurred up to the present yarn cut. The sum SD is also stored to the memory 22. There is, furthermore, a trigger 84 having two inputs, one of which is the output of preceding gate 82, i.e. the actual sum of differences, and the other input is a limit value GSD representing the maximum allowed sum of differences. If the actual sum of differences is greater than the allowed sum of differences, an alarm is given to the general alarm unit 23. It should be noted that the zero-signal UOn will be the basis, i.e. the zero point of tension measurement during the next winding cycle and may also be set in the memory 22 as the lowest accepted value LU of yarn tension.

In the drawings and specification, there has been set forth a preferred embodiment of the invention, and although specific terms are employed, they are used in a generic and descriptive sense only and not for purposes of limitation.

That which is claimed is:

1. A method of measuring the tension of an advancing yarn which is subject to interruptions in its path, which is characterized by the ability to correct for any errors in the zero point output signal of the tension sensor, and comprising the steps of
    continuously monitoring the tension of the advancing yarn with a sensor so that the sensor produces an output signal representative of the tension,
    monitoring the output signal of the sensor whenever the yarn path is interrupted to thereby produce a zero point output signal (UOn) upon each interruption, and storing each zero point output signal in a computer memory,
    comparing each zero point output signal (UOn) with a previously generated zero output signal (UOn-1) to determine a zero point drift (D), and generating an alarm signal when the drift (D) exceeds a predetermined limit value (GD).

2. The method as defined in claim 1 comprising the further step of, after each interruption of the path of the yarn, inputting the zero point output signal as the zero point signal for the subsequent yarn advancing cycle.

3. The method as defined in claim 1 wherein the step of storing each zero point output signal in a computer memory includes delaying such storing for a predetermined time period after the advance of the yarn is interrupted to permit the sensor to reach a steady state condition.

4. A method of measuring the tension of an advancing yarn which is subject to interruptions in its path, which is characterized by the ability to correct for any errors in the zero point output signal of the tension sensor, and comprising the steps of
    continuously monitoring the tension of the advancing yarn with a sensor so that the sensor produces an output signal representative of the tension,
    monitoring the output signal of the sensor whenever the yarn path is interrupted to thereby produce a zero point output signal (UOn) upon each termination, and storing each zero point output signal in a computer memory,
    comparing each zero point output signal (UOn) with a previously generated zero output signal (UOn-1) to determine a zero point drift (D), and storing such drift in the computer memory,
    summing the values of the drift (D) occurring after each of the interruptions of the yarn advance to define a drift sum (SD), comparing the drift sum to a predetermined drift sum limiting value (GSD), and generating an alarm signal when the drift sum exceeds said drift sum limiting value.

5. The method as defined in claim 4 wherein the step of comparing each zero point output signal with the previously generated zero output signal includes generating a further alarm signal when the drift (D) exceeds a predetermined limit value (GD).

6. The method as defined in claim 4 wherein the path of the yarn is interrupted by severing the yarn by actuating a yarn cutter.

7. The method as defined in claim 6 wherein the step of severing the yarn is triggered when the output signal of said sensor means falls below a predetermined lower limit value (LU).

8. The method as defined in claim 4 wherein the step of storing each zero point output signal in a computer memory, and the step of storing such drift in the computer memory, each include delaying such storing for a predetermined time period after the path of the yarn is interrupted to permit the sensor to reach a steady state condition.

9. The method as defined in claim 4 comprising the further step of, after each interruption of the path of the yarn, inputting the zero point output signal as the zero point signal for the subsequent yarn advancing cycle.

10. An apparatus for measuring the tension of an advancing yarn which is subject to interruptions in its path by reason of the severance of the advancing yarn, comprising
    sensor means for continuously monitoring the tension of the advancing yarn so as to produce an output signal representative of the tension,
    means for selectively severing the advancing yarn, so that the output signal of said sensor means defines a zero point output signal (UOn) upon each such severance,
    computer memory means for storing each zero point output signal,
    first circuit means for comparing each zero point output signal (UON) with a previously generated zero output signal (UOn-1) to determine a zero point drift (D), for storing such drift in said computer memory means, and for generating an alarm signal when the drift exceeds a predetermined limit value (GD), and second circuit means for summing the values of the drift (D) occurring after each severance of the yarn to define a drift sum (SD), for comparing the drift sum to a predetermined drift sum limiting value (GSD), and for generating a further alarm signal when the drift sum exceeds said drift sum limiting value.

* * * * *